T. STENHOUSE.
MANUFACTURE OF ARTICLES OF GLASS.
APPLICATION FILED NOV. 12, 1914.

1,297,412.

Patented Mar. 18, 1919.
8 SHEETS—SHEET 1.

Fig.1

T. STENHOUSE.
MANUFACTURE OF ARTICLES OF GLASS.
APPLICATION FILED NOV. 12, 1914.

1,297,412.

Patented Mar. 18, 1919.
8 SHEETS—SHEET 2.

T. STENHOUSE.
MANUFACTURE OF ARTICLES OF GLASS.
APPLICATION FILED NOV. 12, 1914.

1,297,412.

Patented Mar. 18, 1919.
8 SHEETS—SHEET 3.

Witnesses:
Raphaël Netter
C. D. Morrill

Inventor
Thomas Stenhouse,
By his Attorney
Clarence Stern

T. STENHOUSE.
MANUFACTURE OF ARTICLES OF GLASS.
APPLICATION FILED NOV. 12, 1914.

1,297,412.

Patented Mar. 18, 1919.
8 SHEETS—SHEET 4.

Witnesses:
Raphaël Netter
C. D. Morrill

Inventor
Thomas Stenhouse
By his Attorney
Clarence D. Kerr

T. STENHOUSE.
MANUFACTURE OF ARTICLES OF GLASS.
APPLICATION FILED NOV. 12, 1914.

1,297,412.

Patented Mar. 18, 1919.
8 SHEETS—SHEET 8.

UNITED STATES PATENT OFFICE.

THOMAS STENHOUSE, OF WASHINGTON, PENNSYLVANIA, ASSIGNOR TO HAZEL-ATLAS GLASS COMPANY, OF WHEELING, WEST VIRGINIA, A CORPORATION OF WEST VIRGINIA.

MANUFACTURE OF ARTICLES OF GLASS.

1,297,412. Specification of Letters Patent. Patented Mar. 18, 1919.

Application filed November 12, 1914. Serial No. 871,659.

*To all whom it may concern:*

Be it known that I, THOMAS STENHOUSE, a citizen of the United States, residing at Washington, Washington county, Pennsylvania, have invented new and useful Improvements in the Manufacture of Articles of Glass, of which the following is a specification, reference being had to the accompanying drawings, in which—

Fig. 6 is a plan of various operating mechanisms; Figs. 7 and 7ª show details of the mold and unlocking mechanism; Fig. 8 is a section on line VIII of Figs. 2 and 6, showing the operation of pressing the blank, and Figs. 8ª and 8ᵇ are details of the controlling mechanism therefor; Fig. 9 is a detail of the mold-operating mechanism, on line IX—IX of Fig. 3.

My invention relates to improvements in the manufacture of glass articles and consists in automatic mechanisms for separating the glass into predetermined quantities, and for pressing and blowing the separated quantities into the desired shapes. My invention in particular provides mechanism for the manufacture of articles of glass having internal or external threaded parts. My invention also consists in the arrangement and coöperation of the parts which are hereinafter described and claimed.

Referring to the drawings, A represents the spout projecting from the furnace B, C the machine or structure comprising the various parts later to be described, D the mold-carrying table having a plurality of molds E. I have shown the molds mounted upon the table and I have indicated the ten stations at which the molds will come to rest in a single revolution of the table by the reference letters *a, b, c, d, e, f, g, h, i* and *j*.

Figure 1:
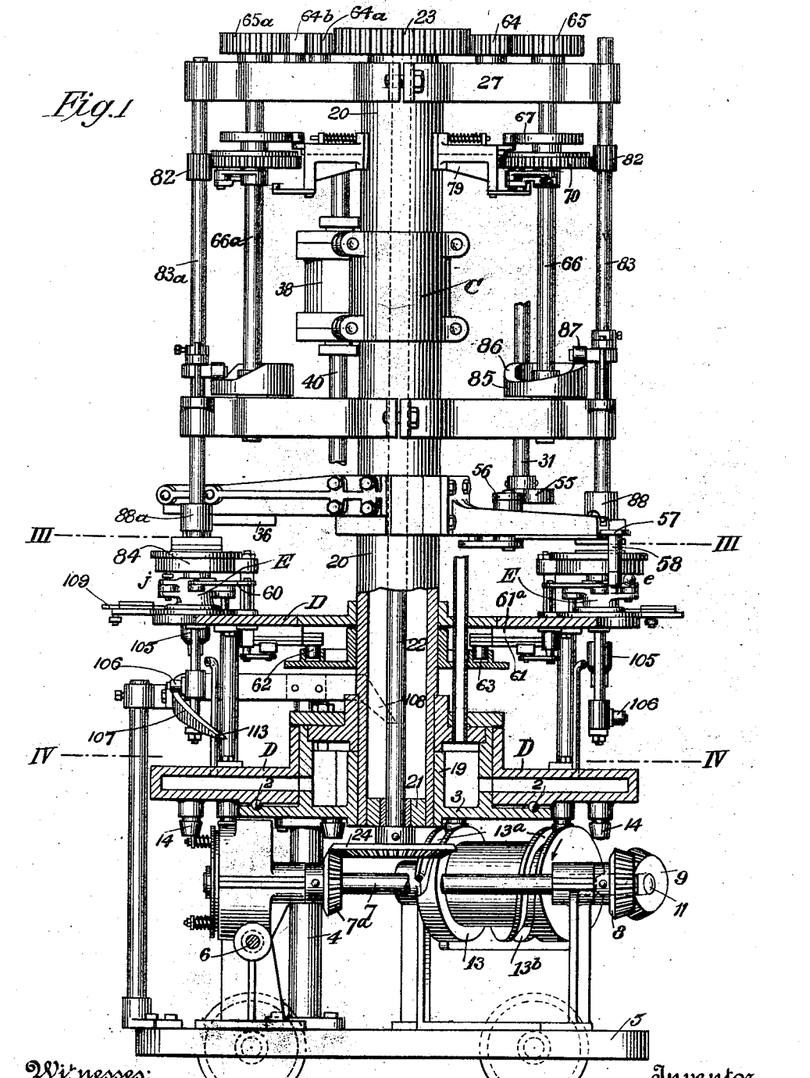
Figure 1 is an elevation, partly in section, on line I—I of Fig. 3, of a mechanism embodying my invention.
Figure 2:
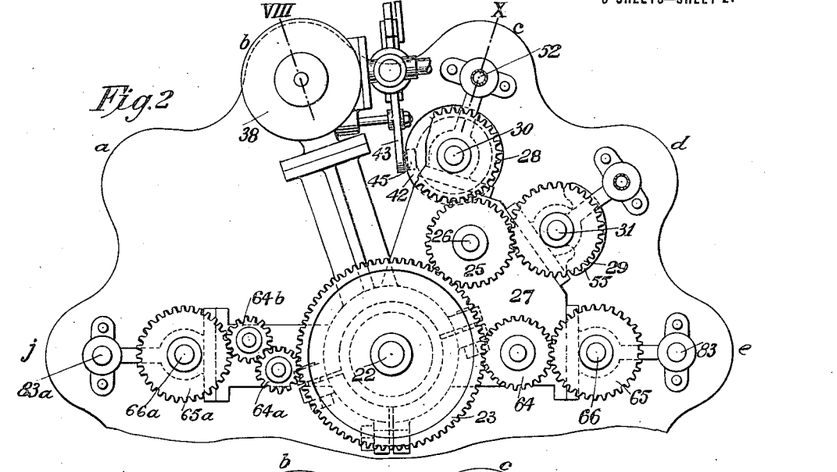
Fig. 2 is a partial top plan thereof.
Figure 4:
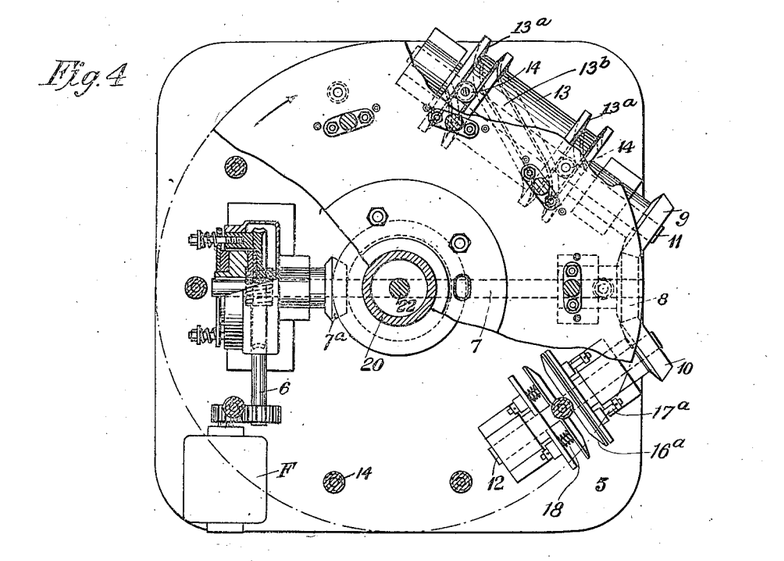
Fig. 4 is a section on lines IV—IV of Fig. 1, partially broken away, showing the driving and shock-absorbing mechanism for the device.
Figure 5:
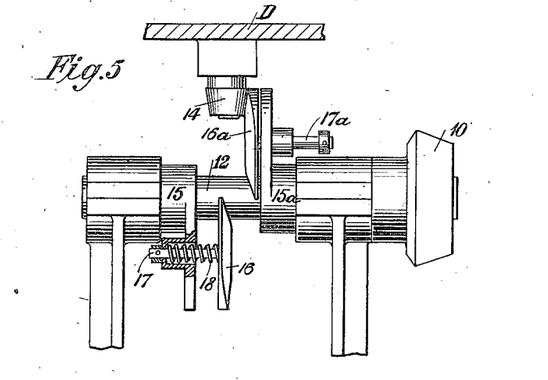
Fig. 5 shows in detail the mold table shock-absorbing mechanism.

The mold table D is rotatively mounted upon ball bearings 2 which have a corresponding ball race in the stationary table 3. The stationary table 3 is supported by columns 4, positioned and bolted to the base plate 5 of the structure C. Power for the various parts of the machine C is supplied by a motor F or other suitable source of power, through the continuously rotating shaft 6, which is geared to and drives the shaft 7. The shaft 7 has on its opposite end a bevel gear wheel 8, which engages corresponding gear wheels 9 and 10, which preferably have their centers set at an angle of 36 degrees and which are mounted respectively on the shafts 11 and 12. Upon the shaft 11 is a helix cam 13, which engages in succession with the rollers 14, of which I have shown ten, equally spaced, attached to the under side of the base of the mold table D near its periphery. Each revolution of the helix cam 13 advances the table D one-tenth of a revolution. The cam 13 has parallel portions 13ª near its ends which are occupied by adjacent rollers 14 when the table D is at rest, which position is shown in Figs. 1 and 4. The cam 13, meanwhile, continues to revolve and, when its intermediate helical portion 13ᵇ engages the rear roller 14, it again moves the table D forwardly. The table-arresting and starting shaft 12, which I have described as having a gear 10 engaging the gear 8 of the shaft 7, has mounted upon it an arresting device 15 and a starting device 15ª, the functions of which are to engage one of the rolls 14 as the table D advances, and either stop or start the table D without shock. The arrester 15 has a steel plate 16 slidably fastened thereto by a pin 17, held in outward position by a compression spring 18, thus serving, as it revolves about the shaft 12, to come into contact with a roll 14 and absorb the shock of the table D and bring it to a gradual rest. On the opposite side of the shaft 12, and set at 180 degrees from the arrester 15, is a similar starting mechanism 15$^a$, having a plate 16$^a$, slidably fastened thereto by a pin 17$^a$, which is held in outward position by a compression spring similar to the spring 18. The plate 16$^a$ serves, when rotated into the position shown in Fig. 5, the purpose of imparting an initial impulse to the table D and thereby relieves it from shock when the helix cam 13 engages a roll 14 for forward movement.

Fitted into the hub 19 of the stationary table 3 is a hollow column 20, having suitable bearings 21 for the shaft 22, which has a master gear 23 at its upper end and a bevel gear 24 at its lower end. The bevel gear 24 is driven by a gear 7$^a$ secured to the shaft 7, and the gear 24 in turn drives the shaft 22 and with it the master gear 23. The master gear wheel 23 has the proper ratio to its complementary driven parts to properly regulate the various movements therefor.

Figures 6, 7, 7A:
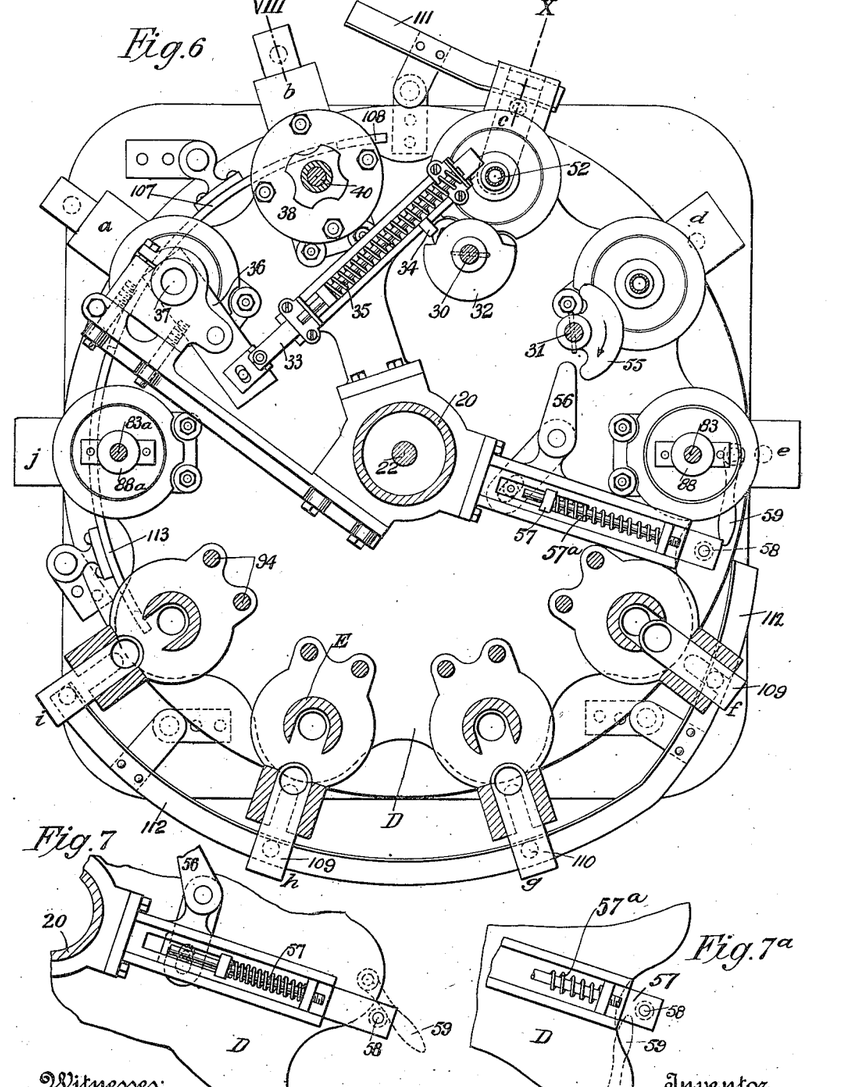

I will now describe the mechanisms actuated in connection with the various steps performed in making the articles of glass. Meshing in with the master gear 23 is an intermediate gear wheel 25, mounted on a stud pin 26, which is attached to a bracket 27. The gear 25 drives gears 28 and 29, which in turn operate the shafts 30 and 31 respectively. Keyed to the shaft 30 is a cam 32, which operates a sliding bar 33 by engaging a trigger latch 34 to impel it in one direction, as is shown in Fig. 6. When the cam 32 releases the latch 34 the spring 35 returns the bar 33 to its initial position. The bar 33 is secured to and operates the water-cooled cut-off knife 36, which intermittently supports and severs the stream of glass which flows through the container 37, which is positioned at station $a$.

Figures 8, 8A, 8B, 9:
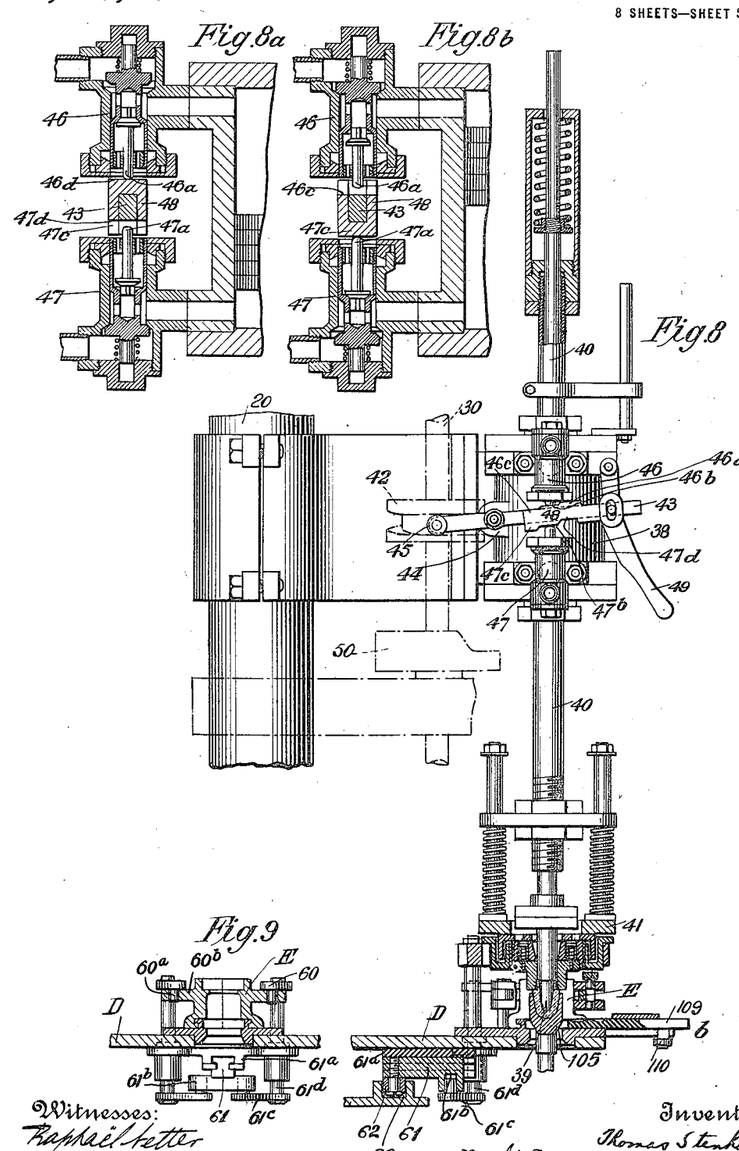

The glass-pressing mechanism, at station $b$, preferably consists of the usual fluid-operated cylinder 38, equipped with plunger 39, plunger rod 40 and spring plate 41, and is operated as is shown in Figs. 8, 8$^a$ and 8$^b$, by the following mechanism:

The shaft 30, which operates the cutting-off device through the cam 32, also has mounted upon it a cam 42, which actuates the glass-pressing mechanism. A lever 43 is pivoted to a bracket 44, and has upon one of its ends a roller 45, with which the cam 42 coöperates to raise or lower the lever 43. The opposite end of the lever 43 engages with the cylinder valves 46, 47 by means of a slidable collar 48, which is adjustably controlled by a hand lever 49.

When in normal actuating positions the pistons 46$^a$ and 47$^a$ of the valves 46 and 47 respectively engage the collar 48 at the portions 46$^b$ and 47$^b$. When, however, it is desirable to retain the plunger 39 in a fixed upward position irrespective of the movement of the lever 43, the slidable collar 48, by the operation of the hand lever 49, is moved so that its portion 47$^c$, by contact with the piston 47$^a$, will permanently open the valve 47, and thereby maintain the plunger 39 in elevated position. Meanwhile, as the opposite side 46$^c$ of the collar 48 is cut away it will not act on the upper valve 46, as is shown in Fig. 8. When it is desired to cause the plunger 39 to descend, irrespective of the operation of the lever 43, or when the remainder of the machine is stationary, the collar 48 is moved to the position shown in Fig. 8$^a$, in which the part 46$^d$ will then keep open the valve 46 and cause the plunger to descend, at the same time the valve 47 will remain closed as the part 47$^d$ is cut away at this point. This mechanism comprises a flexible and simple means of control at the immediate command of the operator.

Figures 10, 11, 12:
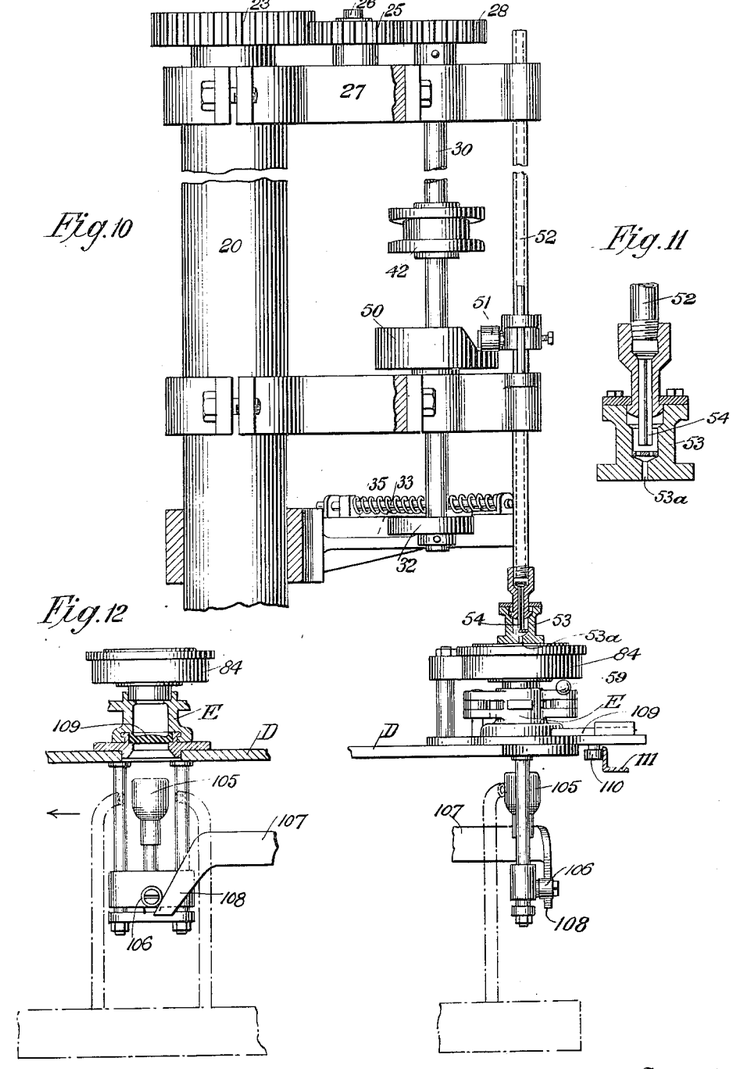
Fig. 10 is a section along line X of Figs. 2 and 6, showing the operation of blowing the blank.
Fig. 11 shows a detail of the controlling valve therefor.
Fig. 12 is a detail showing the mechanism for operating the parison mold.

After the pressing operation the glass is subjected to a blowing operation at station $c$, the actuating mechanism for which, shown in Figs. 10 and 11, is to be described as follows:

The shaft 30 on which are mounted the cams 32 and 42, which actuate the cut-off and pressing mechanisms respectively, also carries a cam 50 which operates a blowing mechanism. The cam 50 engages a roller 51, mounted on a blow pipe 52 which is connected to the air supply. On the lower end of the pipe 52 is a valve 53, containing a piston 54 of angular shape in cross section, which seats on the top of the molds in succession. When the cam 50 permits the pipe 52 to drop into the position shown in Fig. 10, the valve is opened and permits air to pass through the aperture 53$^a$ into the mold to blow the article. When the pipe 53 is raised, as is shown in Fig. 11, the valve is closed and the air is cut off.

After the article has been blown (which may occur in one or more operations, the machine as shown being equipped for two blowing operations at stations $c$ and $d$), the molds are opened in passing the stations at $f$, $g$, and $h$, as follows:

The shaft 31, as is shown in Fig. 6, has mounted upon it a cam 55, which strikes one arm of a bell crank lever 56, thereby rotating the other arm against a sliding bar 57, having a roller 58 mounted thereon.

As the table approaches the station $f$ the sliding bar 57 with its roller 58 is driven outwardly at the moment when the mold table D advances, so that the roller 58 will push the mold-handle 59, outwardly, as is shown in Figs. 7 and 7$^a$, thereby unlocking the mold and enabling the mold to be freely sprung open by the action of the arms 60. When the cam 55 has revolved sufficiently to release the lever 56, the spring 57ª, acting on the bar 57, forces it back to its original position, thus completing the release of the mold-handle and assuming a position ready to engage the next succeeding mold-handle.

Figure 3:
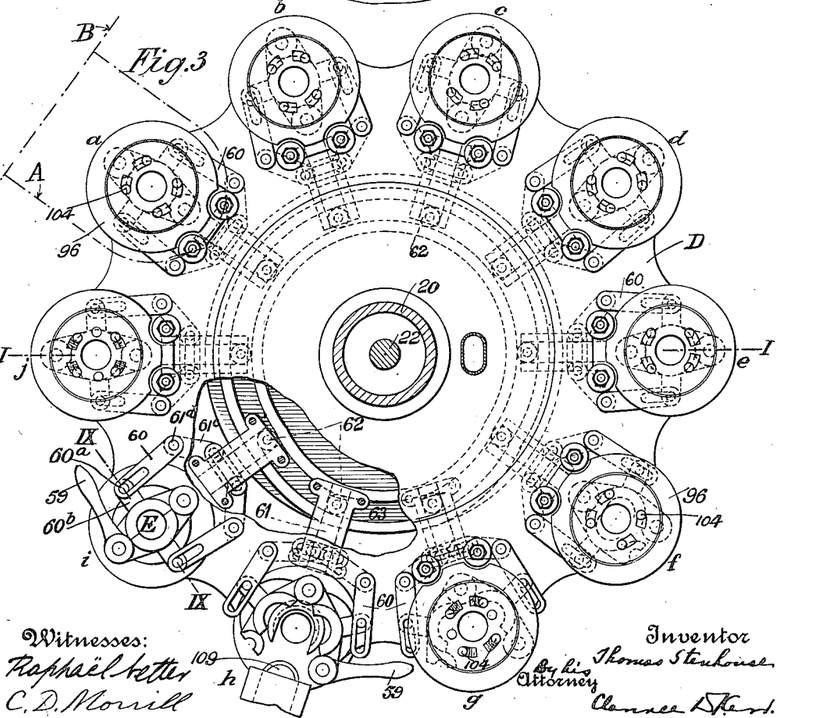
Fig. 3 is a section on line III—III of Fig. 1, showing in plan the arrangement of the molds.

When the mold reaches the station $f$ it is ready to be opened, and this operation takes place as it is passing the stations $f$ and $g$. As is shown in Fig. 3, the eccentrically-disposed cam slot 63 is mounted on the stationary column of the machine, in which the rollers 62 of the plate 61 operate. The plate 61 is slidably mounted in guides 61ª on the underside of the table, and has a depending portion 61ᵇ, to which are pivoted the rock shaft arm 61ᶜ, which are keyed to the vertically disposed rock shaft 61ᵈ. Mounted near the upper ends of the rock shafts 61ᵈ are arms 60, which are slotted so as to be held in slidable engagement with the pins 60ª of the mold lugs 60ᵇ. As the plate 61 is moved outwardly by the eccentricity of the cam slot 63, the mold, when it has been unlocked as described, is forced open by the radial movement of the arms 60 upon the shafts 61ᵈ and as the plate 61 is subsequently drawn inwardly by the cam slot 63 and the arms 60 are moved toward each other by the consequent rotation of the shafts 61ᵈ, the molds will be shut.

Figure 13:
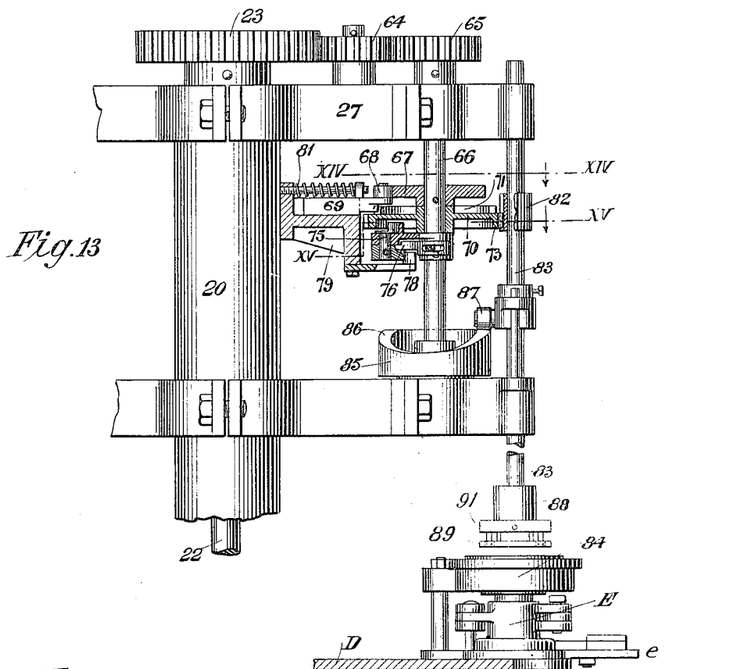
Fig. 13 shows an elevation of the unscrewing device.
Figure 14:
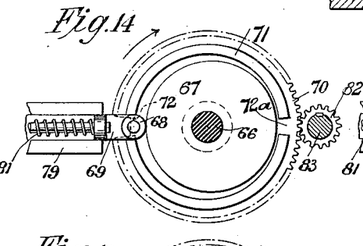
Figs. 14 and 14ª are sections showing two positions of the parts, on line XIV—XIV of Fig. 13.
Figures 14A, 15A:
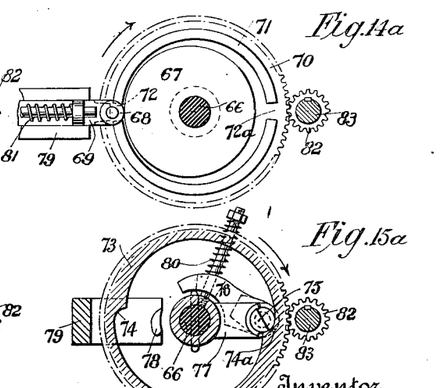
Figure 15:
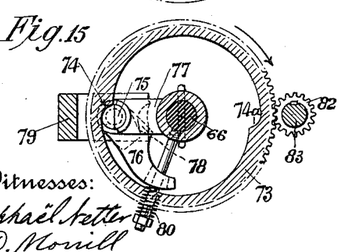
Figs. 15 and 15ª are sections showing two positions of the parts, on lines XV—XV of Fig. 13.
Figure 16:
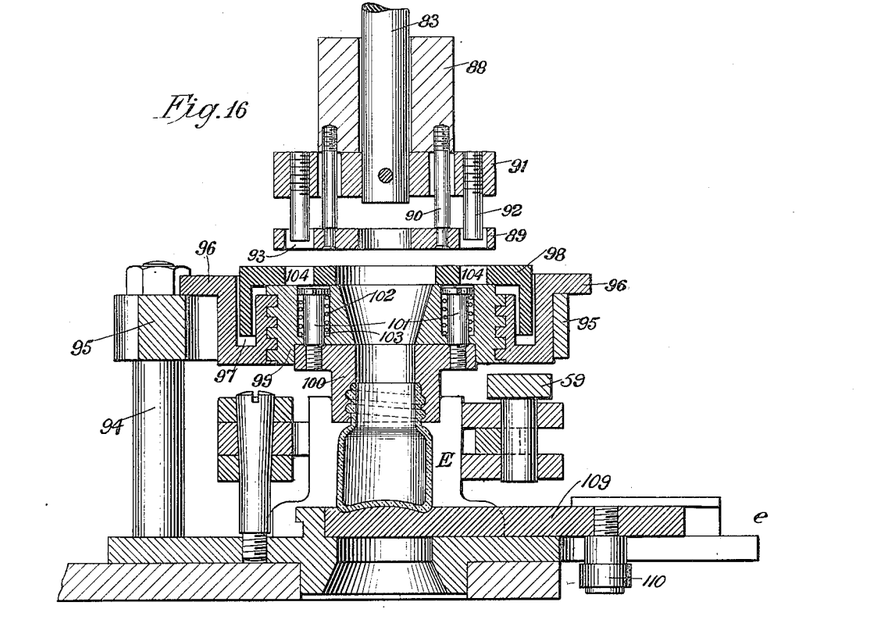
Fig. 16 shows a section of the unscrewing mechanism before the forming block has been unscrewed.
Figure 17:
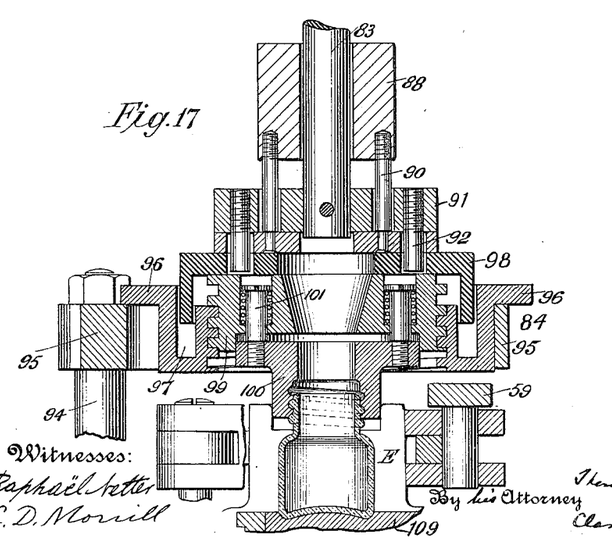
Fig. 17 shows the device in process of unscrewing.

When threaded articles are being manufactured, the threads which have been formed on the articles in the pressing operations, are next released from the threaded part of the mold by mechanism constructed and operated at station $e$ as follows:

Mounted on the bracket 27 is an intermediate gear 64, driven by the master gear 23, and which drives in turn the gear 65, which is positioned on a shaft 66. The shaft 66, as is shown in Fig. 13, has keyed thereto an eccentric cam 67, which is in engagement with a roller 68 on a stop member 69. Below the cam 67 is a gear wheel 70, loosely mounted on the shaft 66. The gear wheel 70 has near its periphery an upwardly-extending flange 71, in which are recesses 72 and 72ª, 180 degrees apart for reception of a portion of stop member 69. The gear 70 has also a downwardly-extending flange 73, which has shoulders 74 and 74ª, 180 degrees apart, which come into engagement with a segmental pin 75 forming the pivot of a latch lever 76, which is mounted on a support 77 keyed to the shaft 66. The pin 75 and lever 76 are oscillated by a latch 78, secured to the bracket 79. The latch lever 76 is normally maintained with the pin 75 in engagement either with the shoulder 74 or the shoulder 74ª, as is shown in Fig. 15ª, by the spring 80, against which the lever 76 is forced outwardly when it comes into contact with the latch 78, as is shown in Fig. 15.

The stop member 69, which is mounted in the bracket 79 secured to the stationary column 20, is always pressed outwardly by the spring 81, with its roller 68 against the cam 67. When the eccentricity of the cam 67 permits, the stop 69 will seat in either the recess 72 or 72ª, and will hold the gear 70 against movement. The continued movement of the cam 67, by its contact with the roller 68, however, forces back the stop 69 out of engagement with either recess 72 or 72ª in which it may be seated, and gear 70 is then free to move. At the same time that the stop 69 has been forced out of engagement with the recess 72 or 72ª, the segmental pin 75, which is carried by its constantly revolving support 77, will engage one of the shoulders 74 or 74ª, and will carry the gear 70 with it one-half of a revolution, at which point the stop 69 will again enter the recess 72 or 72ª, and the latch 78, by its contact with the latch lever 76, will release the engagement between the shoulder 74 or 74ª and the pin 75. The further revolution of the shaft 66 will cause the cam 67 to disengage the stop 69 from the recess 72 or 72ª, and the stop 75 to engage the shoulder 74 or 74ª, thereby causing the further rotation of the gear 70.

The gear 70 is in mesh outwardly with a pinion 82, mounted on a shaft 83, which is revolved intermittently by the action of the gear 70, to effect the unscrewing of the screw-off device 84 from the threads of an article of glass contained in a mold E at the station $e$. Positioned on the shaft 66 is a disk 85, having a cam surface 86 on its upper face, which co-acts with a roller 87 secured to the shaft 83, the purpose of which is to lower the shaft 83 so that the mechanism at its lower end will engage the screw-off device 84 and rotate it, to release the threads on the article of glass. When the releasing action has been completed, the cam surface 86 will elevate the mechanism at the lower end of the shaft, so that it will be out of engagement with the screw-off device.

The lower end of the shaft 83 supports a collar 88, having a plate 89 secured thereto by the bolts 90. Attached to the end of the shaft 83, below the collar 88, is a plate 91, apertured for the bolts 90, and having depending pins 92, which are free to pass through apertures 93 in the plate 89. The screw-off device 84, with which the parts just described coöperate, is to be described as follows:

Secured to the mold table by the bolts 94 is a support 95, upon which is mounted an annular member 96, which has a recess 97 therein, for reception of the thread protector ring 98, which prevents particles of glass from reaching and clogging the threads. The thread protector ring 98 is attached to the neck ring support 99, to which the neck ring 100, which is preferably made of a single piece of metal, is secured by the fillister headed screws 101. The springs 102 are interposed between the heads of the fillister screws and shoulders in the recesses 103 in the neck ring support 99. The fillister headed screws 101 and the springs 102 provide an adjustable movement so as to compensate for the difference in pitch of the threads in the neck ring support and in the neck ring, and to provide clearance so as to clear the top edge of the article as soon as the neck ring is released from the thread on the article. The thread protector ring 98 has in its top surface a plurality of apertures 104, with which the pins 92 engage to cause the unscrewing of the neck ring.

The operation of the machine with the glass flowing from the furnace spout A and with the various parts actuated by the master gear 23, is as follows:

The glass at station a flows from the spout A through the container 37 and from the container 37 into a mold E, the glass being cut in predetermined amounts and at predetermined intervals by the cut-off knife 36, which reciprocates across the lower face of the container 37. When the glass has entered the mold E at station a, it is supported by the parison mold 105, which is in elevated position, such as is shown in Fig. 8.

The mold E, having been filled, is advanced to the station b by the movement of the table D, actuated by the starting mechanism 15ª, and the helix cam 13. When the table has been brought to rest at station b by the arrester 15, the plunger 39, which is actuated by the shaft 30 through the cam 42, lever 43 and valves 46 and 47, will descend and will form the glass, forcing it upwardly to form the threaded neck of the blank, as shown in Fig. 8. The plunger 39 is then retracted and the blank is supported by means of its threaded engagement with the neck ring 100. The table is then advanced to blowing station c and the parison mold 105, which has been supported by the engagement of the roller 106 with the track 107, drops down the inclined end 108 of the track 107, and at the same time the bottom 109 of the mold, which has on its under surface a roller 110, will engage the inner surface of the strap 111 and will be moved inward into operative position, as is particularly shown in Fig. 10. As the machine comes to rest with the mold at the station c, the cam 50 will actuate the blow pipe 52, lowering it and thereby opening the valve and admitting the air through the port 53ª into the mold, and the blank may then be wholly or partially blown. The mold is then advanced by the rotation of the table to a further blowing station d, at which there is in position mechanism similar to that at station c, operated by the shaft 31.

The mold is next advanced by the rotation of the table to the screw-off station e. At this station the cam surface 86 permits the shaft 83 to be lowered, so that the pins will enter the apertures 104 in the thread-protector ring 98. The shaft 83 will then be rotated by means of the gear 70 (a one-half rotation of the gear 70 being adapted to give the shaft 83 a rotation of three complete revolutions), which will unscrew the threaded engagement between the annular member 9 and the neck ring support 99, and at the same time the neck ring 100 will likewise be unscrewed from the neck of the article, the fillister screws 101 and the springs 102 acting to provide a compensating movement which eliminates the transmission of shock to the neck of the article, and also lifts the neck ring 100 above the top of the article when the neck ring 100 has been released from engagement of the screw threads on the article.

Further rotation of the mold table, as is shown in Fig. 6, will bring the mold to the mold-unlocking mechanism by which the shaft 31 actuates the lever 56 to throw the pin 58 into the path of the handle 59, thus rotating it and unlocking the mold, so that when the mold has reached the station f the mold is ready to be opened.

The further rotation of the table, as the mold approaches the station g, will force the mold open by reason of the action of the cam slot 63, which forces the plate 61, and with it the links 60, outwardly to open the mold, as is shown in Fig. 3. The mold also remains open at station h, so that the completed article may be removed at either station g or h. A further movement of the table will retract the plate 61 and the link 60 by reason of the eccentricity of the cam slot 63, and will thus close the mold as it approaches station i. The further revolution of the table will bring the mold to station j, at which the neck ring 100 is again screwed down into the top of the mold by a movement which is just the reverse of the movement performed at station e, in which position the mold is again ready for the reception of glass at station a, to which it will next move.

The mechanism for screwing in the neck ring 100 is similar to that used in operating the unscrewing device 84, except that the shafts 66ª and 83ª are revolved in a reverse direction to that of the shafts 66 and 83 by reason of the interposition of the gears 64ª and 64ᵇ between the master gear 23 and the gear 65ª.

While the mold E is moving from station e to station f, the roller 110 of the mold bottom 109 engages the outer face of the cam track 112, and as the mold is unlocked and opened at stations f and g the mold bottom is drawn out so as to permit the article to be easily removed, as is shown in Fig. 6. At the station *i* at which the mold is locked, the roller 106 of the parison mold 105 engages the inclined end 113 of the track 107, which elevates the parison mold into position to receive the glass when the mold has again reached station *a*.

It is obvious that various modifications may be made in the mechanisms and in the manner of operating them which I have shown and described, without departing from my invention.

What I claim is:

1. In mechanism for making articles of glass, a mold carrier having a plurality of molds mounted thereon, severing, pressing, blowing and unscrewing mechanisms, each being operated by a cam mounted on a shaft, and a master gear adapted to drive said shafts in timed relation.

2. In mechanism for making articles of glass, a mold carrier having a plurality of molds mounted thereon, driving mechanism for the mold carrier comprising a helix cam adapted with each revolution to advance a mold from one station to the next, and shock-absorbing mechanism adapted to lessen starting and stopping shocks imparted to the carrier by the helix cam.

3. In mechanism for making articles of glass, an intermittently-driven mold carrier having a plurality of molds mounted thereon, the molds being adapted to be brought to rest successively at predetermined stations, a constantly-driven shaft geared to a plurality of rods, and cams mounted on said rods, one of said cams actuating a severing and supporting knife, another cam actuating a pressing mechanism, a third cam actuating a blowing mechanism, the said mechanisms being positioned above said mold carrier at successive stations and coöperating automatically with said molds as they come to rest at said stations.

4. In mechanism for making articles of glass, an intermittently-operated mold carrier and a plurality of molds mounted thereon, opening and closing mechanism for each mold, means for locking each mold, actuating mechanism adapted to be projected into the path of the locking mechanism on each mold, to unlock it, and a substantially circular cam track eccentrically-disposed about the axis of the machine and coöperating with the opening and closing mechanism of each mold to open the mold after it has been unlocked.

5. In mechanism for making articles of glass, comprising an intermittently-operated mold carrier, a plurality of molds mounted thereon, a neck ring for each mold having a threaded surface, a revoluble support for the neck ring, means for rotating the support to unscrew the neck ring from the glass article, said means comprising a continuously driven shaft and an intermittently driven shaft, said intermittently driven shaft being capable of movement vertically to engage and disengage said revoluble support, a gear fixed to one of said shafts, a second gear intermeshing with the first gear loosely mounted on the other shaft, and a clutch mechanism for causing the second gear to revolve with its shaft, whereby the intermittently driven shaft is rotated to operate the neck ring through its support.

6. In mechanism for making articles of glass, an intermittently-operating mold carrier having a plurality of molds mounted thereon, driving mechanism for the mold carrier comprising a continuously-operating revoluble member engaging successively projections on said carrier for advancing said carrier step by step, and shock absorbing mechanism also engaging said projections successively and adapted to minimize the shocks of starting and stopping the mold carrier.

THOMAS STENHOUSE.

Witnesses:
 JOHN H. SWART,
 GILMER WESTON.